United States Patent [19]

Larsen

[11] Patent Number: 5,140,856
[45] Date of Patent: Aug. 25, 1992

[54] IN SITU BALANCING OF WIND TURBINES

[75] Inventor: Orla W. Larsen, Palm Springs, Calif.

[73] Assignee: Dynamic Rotor Balancing, Inc., North Palm Springs, Calif.

[21] Appl. No.: 621,316

[22] Filed: Dec. 3, 1990

[51] Int. Cl.⁵ .............................. G01M 1/28
[52] U.S. Cl. ........................ 73/455; 73/458; 416/144
[58] Field of Search ............. 73/455, 456, 457, 458, 73/460, 468, 66, 462; 416/144, 145; 290/44, 55

[56] References Cited

U.S. PATENT DOCUMENTS

| | | | |
|---|---|---|---|
| 2,108,624 | 2/1938 | Thearle | 73/455 |
| 2,343,383 | 3/1944 | Martin et al. | 73/455 |
| 4,510,809 | 4/1985 | Fillion | 73/457 |
| 4,641,039 | 2/1987 | Carre | 416/145 |

OTHER PUBLICATIONS

"Bruel & Kjaer Application Notes: Static and Dynamic Balancing of Rigid Rotors"; 20 pps.
"Balancing Calculation Program WW 9021", Bruel & Kjaer, Mar. 1987, 15 pps.

Primary Examiner—John E. Chapman
Attorney, Agent, or Firm—Christie, Parker & Hale

[57] ABSTRACT

A slowly turning rotating mass, such as a wind turbine rotor, is balanced in situ by measuring the magnitude of a phenomenon, such as acceleration, created by rotor unbalance at a location on a mass support shaft which is close to the mass. The measurement of the phenomenon is made along a line selected to be insensitive to the bias of gravity on the mass. The measurement is made while the mass turns at its usual operating rate. The structure which supports the shaft is fixed as rigidly as possible in space while measurements of the phenomenon are made.

9 Claims, 6 Drawing Sheets

MAIN Y: 378μU
X: 0.781Hz

MAIN Y: 64.1DEG
X: 0.781Hz

Fig. 10

| TURBINE # | BEFORE | AFTER | IMPROVEMENT |
|---|---|---|---|
| K-14 | 3.21mU | 148μU | 95.4% |
| K-15 | 1.48mU | 99.7μU | 93.3% |
| K-16 | 11.1mU | 200μU | 98.2% |
| K-17 | 1.67mU | 155μU | 90.8% |
| K-18 | 3.65mU | 109μU | 97.1% |
| K-19 | 30mU | 819μU | 97.3% |
| K-20 | 27.8mU | 1.34μU | 95.2% |
| K-21 | 32.7mU | 622μU | 98.1% |
| K-22 | 2.8mU | 119μU | 95.8% |
| K-23 | 36.4mU | 181μU | 99.6% |
| K-24 | 10.2mU | 447μU | 95.7% |

IN SITU BALANCING OF WIND TURBINES

FIELD OF THE INVENTION

This invention pertains to balancing, at operating speeds, of rotatable masses which turn at very low revolutions per minute. More specifically, it pertains to in situ balancing of the rotor assemblies of wind turbines.

BACKGROUND OF THE INVENTION

Wind turbines are used at various places in the world to generate electrical power from wind energy. In the United States, important areas where substantial numbers of wind turbines of various kinds have been installed and are now operating are in the Altamont area of California east of San Francisco Bay, in the vicinity of Tehachapi, Calif., and also in the vicinity of North Palm Springs, Calif., in the Coachella Valley proximate the southern foot of Banning Pass. In each of the three geographic areas noted above, the wind turbines are operated and maintained by various operators on a contract basis with the owners of the turbines. Both owners and operators of wind turbines desire that the turbines operate reliably with minimum maintenance and repairs of breakdowns.

A common style of wind turbine of Danish design and manufacture has a turbine rotor which is composed of three long slender blades mounted symmetrically about a hub. The hub is carried on the end of a rotor shaft mounted in a nacelle which is carried atop a supporting tower or pylon for rotation about a vertical yaw axis of the turbine. Within the nacelle, the rotor shaft is coupled through a gearbox to a generator which generates electrical power in response to rotation of the rotor, at a characteristic constant speed, by action of wind on the rotor. The coupling of the nacelle to its supporting tower includes a yaw drive mechanism which includes a large diameter main gear fixed to the tower concentric to the yaw axis and with which is engaged a yaw pinion gear. The pinion gear is driven by a yaw drive motor within the nacelle. Operation of the yaw drive motor is controlled by a wind direction sensor which operates the motor to turn the nacelle about its yaw axis to cause the rotor shaft to point into the prevailing wind direction. In such wind turbines, it has been found that the yaw drive mechanisms fail by breakage of the yaw pinion shafts, or by spalling or other failure of the teeth on the yaw pinion gears, beginning at about 3800 ± hours after the turbine has been placed in service. It has been determined that such yaw drive failures are caused, in the large majority of instances, by imbalance of the rotor assembly.

A typical rotor assembly for a wind turbine of the kind described above weighs about 4000 pounds. The hub weighs approximately 1000 pounds and each of the three blades mounted to the hub weighs about 1000 pounds. The total weight of the turbine nacelle including the rotor assembly is on the order of 12,000 pounds; there are some kinds of turbines now in use in which the nacelle, with its rotor, weighs 17,000 pounds or more.

The diameter of a rotor of the Danish design turbine is 52.5 feet. As manufactured, the individual blades for such a wind turbine are statically balanced. Such balancing is accomplished by supporting the opposite ends of the blade on respective scales, and noting the measured weight of the blade as so positioned. If the measured blade weights are not within certain limits, balancing weights of appropriate size are placed in a tube extending within the blade and are fixed at desired locations along the length of the blade to cause the measured end weights of the blade to fall within the desired limits. The blades for a given rotor are individually statically balanced as a set in this manner.

It is common that a set of blades, even though statically balanced to be essentially perfectly matched, manifest unbalance when mounted to the rotor and the rotor is turning at its service speed which, in the case of the Danish designed turbines mentioned above, is about 47 revolutions per minute or about 0.781 Hz., i.e., approximately $\frac{3}{4}$ revolution per second. A wind turbine rotor assembly having three identically matched statically balanced blades can manifest unbalance when turning because of blade-to-blade variations in the distribution of the weight within the blades so that the effective rotating center of gravity of the entire rotor assembly is not on the axis of rotation of the rotor. Such imbalance has been discovered to be the principle cause of failure in the yaw drives of such turbines. Rotor imbalance also contributes meaningfully to the failure, and frequency of failure, of other components of a wind turbine.

In view of the size and weight of the rotor assemblies of wind turbines, it is apparent that the ability to balance a wind turbine rotor in place is very much preferred over balancing such a rotor at a location removed from the wind turbine site. Dismantling and transport of a wind turbine rotor is costly and time consuming; the blades, though large, are delicate, and the risk of damage to them increases the more they are handled.

Sophisticated equipment has been developed and is in wide use throughout the world for balancing rotating masses such as automobile wheel and tire sets, electric motor and electric generator armatures, to name but a few of the many kinds of rotating things which need to be balanced for efficient and reliable operation over extended periods. Those things, however, rotate at relatively high velocities in use as compared to wind turbine rotors which, as noted above, turn very slowly, namely, at less than one turn per second, in use. The existing methodology and apparatus developed for balancing rotating masses is geared to the balancing of masses which rotate at substantially higher revolutions per minute than do wind turbines. A straight forward application of that technology to the balancing of wind turbines has heretofore not been effective. Heretofore, the problem of balancing a wind turbine rotor turning at its service speed has been unsolvable.

SUMMARY OF THE INVENTION

This invention provides a process, and equipment useful to implement the process, for effectively balancing wind turbines in place, i.e., in situ. The invention constitutes a substantial extension of the existing technology for balancing rotating masses into the very low frequency range characteristic of wind turbines. The present invention has been found useful to balance wind turbine rotors in situ very reliably to conditions in which residual imbalance in the rotor is negligible. Using the present invention, a team of skilled technicians can balance two to three wind turbines per day. Wind turbines balanced by use of the present invention are reliable in service.

Generally speaking, one aspect of this invention provides a process for balancing a rotatable mass. The process includes the step, performed while the mass is rotating about its axis of rotation, of measuring a physical phenomenon attributable to unbalance of the mass. The measurement is made along a line selected to be insensitive to the bias of gravity upon the mass. More specifically, the preferred phenomenon which is measured is acceleration, and the measurement of acceleration is made along a horizontal line perpendicular, or substantially so, to the axis of rotation of the mass.

Another aspect of the invention provides a process for in situ balancing of a wind turbine rotor as a component of a wind powered generator in which the rotor is carried on a substantially horizontal shaft in a generator nacelle. The nacelle is rotatable atop a supporting tower about a substantially vertical yaw axis. The process includes the step of locking the nacelle to the tower independently of the presence of any mechanism for driving the nacelle about the yaw axis relative to the tower. The process includes the additional step, performed while the nacelle is locked to the tower, of measuring the value of a phenomenon the magnitude of which is indicative of unbalance of the rotor.

In terms of apparatus, the invention provides a yaw lock which is useful in a wind turbine generator system in which a bladed rotor is rotatable about a substantially horizontal axis and is carried by a nacelle assembly which is rotatable about a substantially vertical yaw axis relative to a supporting tower atop which the nacelle assembly is carried. The yaw lock is releasibly attachable to the nacelle assembly and to the tower for essentially rigidly securing the nacelle from rotation about the yaw axis. Use of the yaw lock across the connection of the nacelle to its supporting tower facilitates accurate measurement of unbalance in the rotor.

DESCRIPTION OF THE ACCOMPANYING DRAWINGS

The above mentioned and other features of this invention are more fully set forth in the following description of the presently preferred embodiment of this invention, which description is presented with reference to the accompanying drawings, wherein:

FIG. 7 is a representative printout similar to that of FIG. 6 showing the unbalance magnitude and phase angle for the same turbine to which FIG. 6 is pertinent when a first amount of trial weight is applied to the rotor for diagnostic purposes;

DESCRIPTION OF THE ILLUSTRATED EMBODIMENTS

Figure 1:
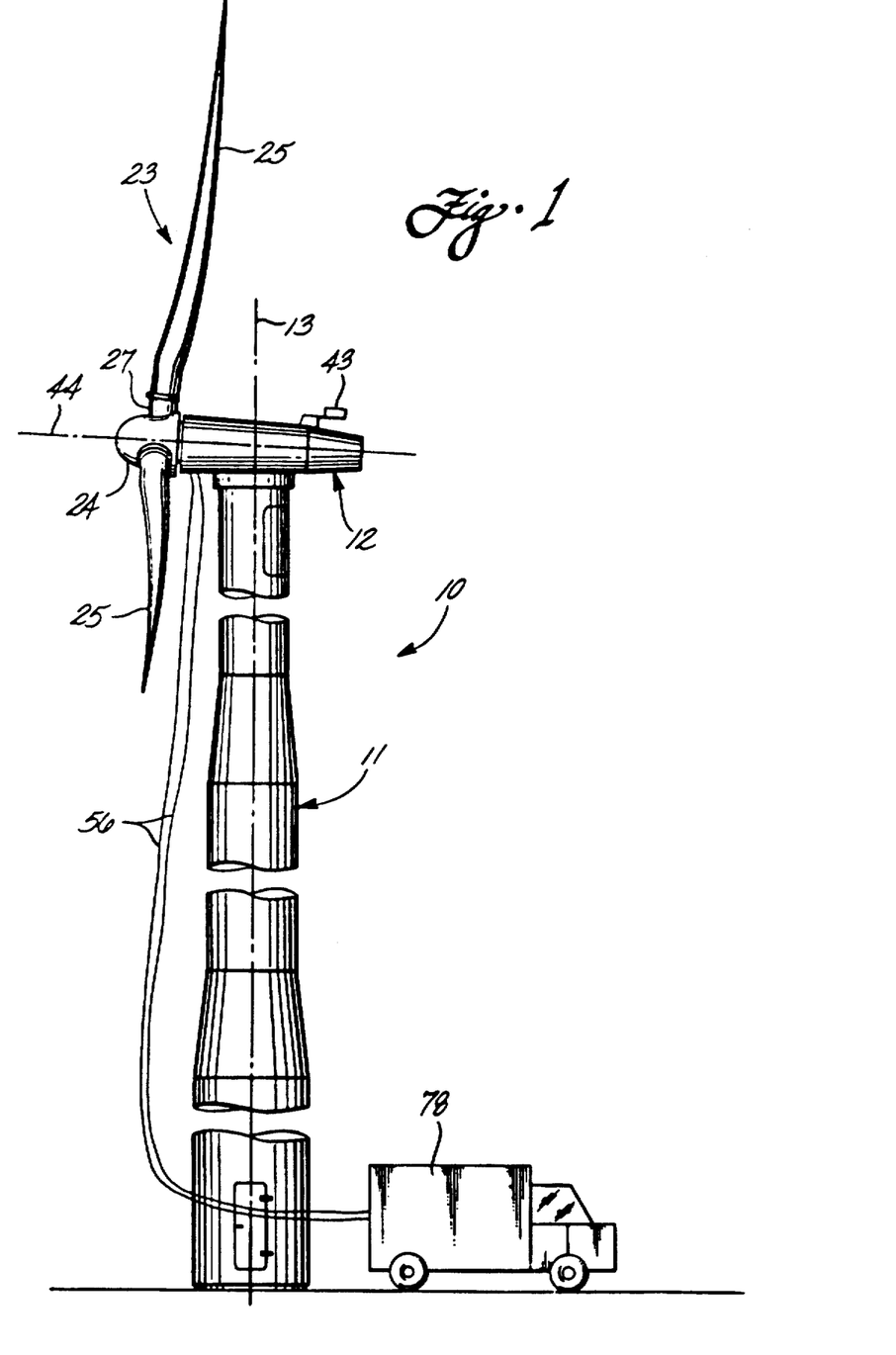
FIG. 1 is an elevation view of a wind turbine in the process of being balanced.
Figure 2:
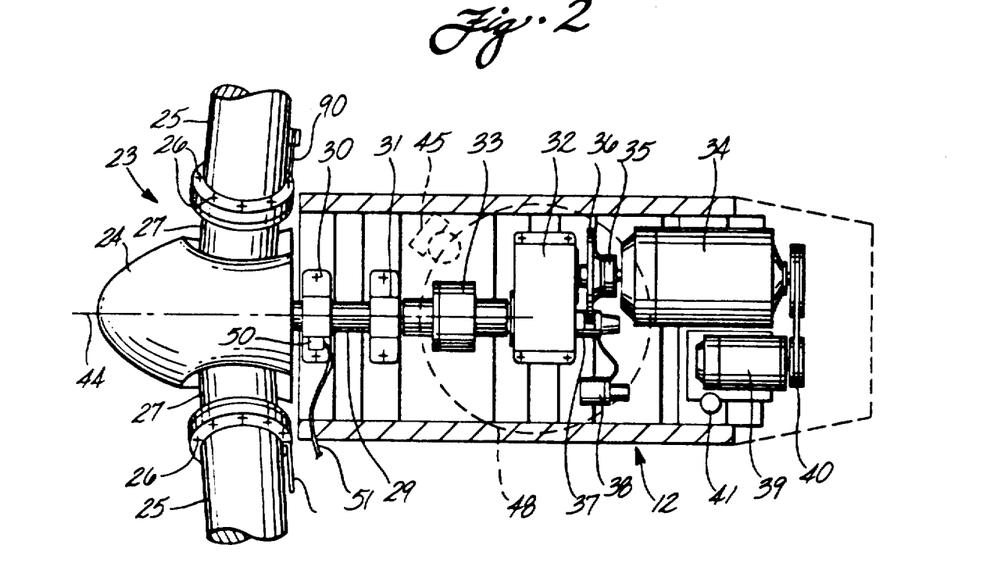
FIG. 2 is a simplified plan view of the principle components of the nacelle of the wind turbine shown in FIG. 1.

A wind turbine 10 is shown in FIG. 1 in the course of being balanced. FIG. 2 shows the essential elements of the nacelle 12 of turbine 10 as instrumented for in situ balancing by practice of this invention. Nacelle 12 is mounted atop a tower or pylon 11 for rotation about a vertical yaw axis 13. The nacelle is rotatably supported on the top of the tower by an annular ball bearing assembly having outer and inner members 14 and 15, respectively, between which a plurality of ball bearings 16 are disposed in cooperating race grooves. The outer ring of the ball bearing assembly rests on a horizontally disposed bearing support ring 17 which forms the extreme upper end of tower 11 and which extends inwardly from the cylindrical upper extent of the tower around the circumference of the tower. A plurality of gussets 18 are welded to the underside of ring 17 and to the inner surface of the tower at a plurality of equally spaced locations about the circumference of the tower. There are 30 such vertically disposed gussets around the circumference of the tower of a Micon 65 wind turbine; there are about the same number of gussets on a Nordtank 65 turbine tower. The opposing faces of each adjacent pair of gussets are substantially parallel to each other, even though the individual gussets are disposed in vertical planes oriented radially of the central axis of the tower. The outer ring of the bearing assembly is secured to support ring 17 by bolts 19. The lower surface of a nacelle foundation plate 20 rests upon an upper face of the bearing assembly inner ring. The nacelle foundation plate and the bearing inner ring are secured to each other by a plurality of bolts 21 passed through the ring and the foundation plate at regular intervals along a circle concentric to the nacelle axis.

Figure 4:
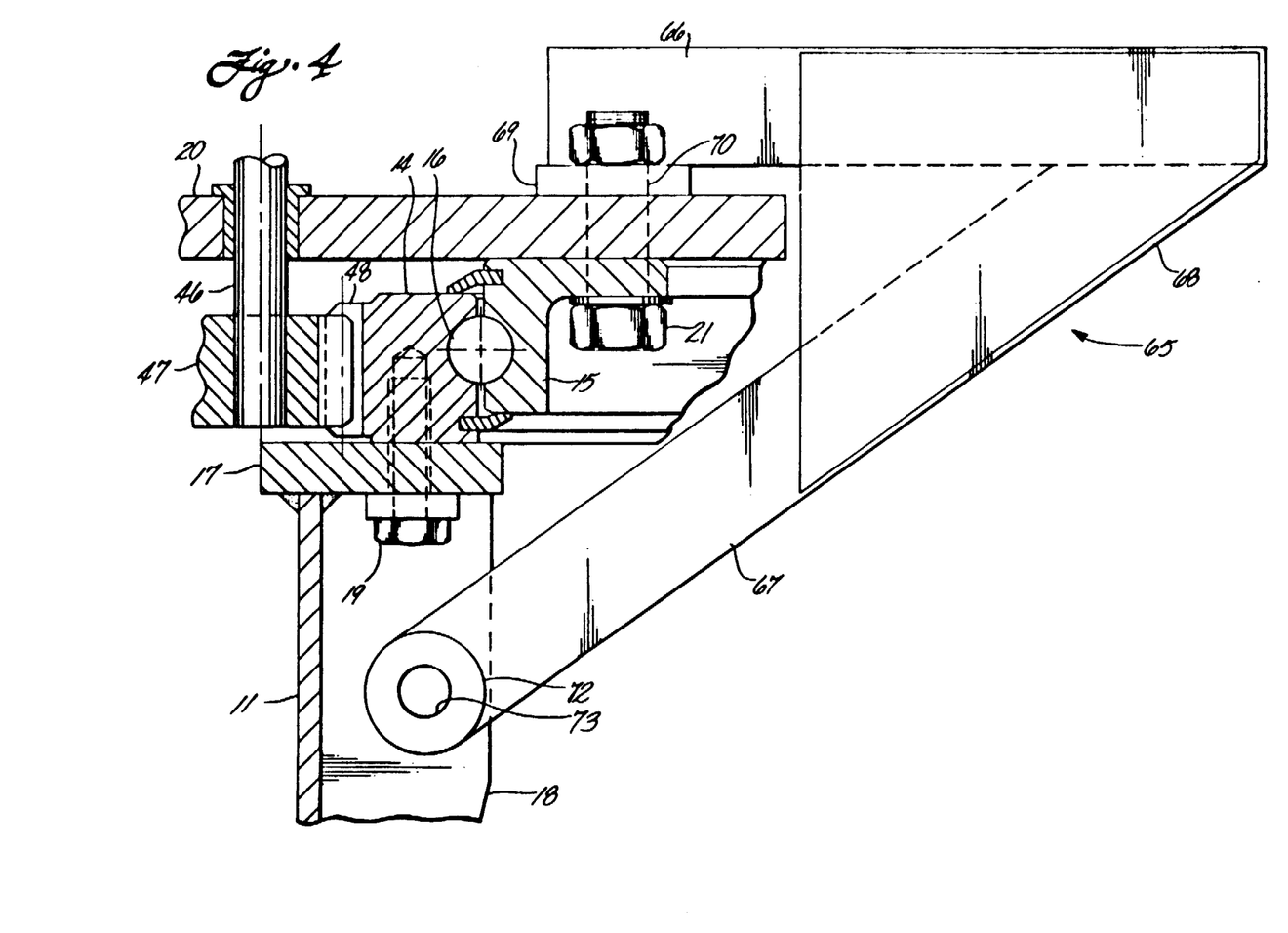
FIG. 4 is an elevation view, partially in cross-section, showing the structure and manner of connection of a yaw lock to rigidly secure the nacelle relative to the tower in the wind turbine shown in FIG. 1 during the balancing process.

If desired, the nacelle bearing assembly could be arranged so that its inner annular member is affixed to the tower and its outer annular member is affixed to the nacelle. Also, the bearing assembly could be constructed as a roller bearing rather than as a ball bearing. Further, the bearing support plate could be positioned to straddle the upper end of the tower or to extend outwardly from the upper end of the tower, and the arrangement and placement of the gussets could be revised accordingly.

Turbine 10 includes a rotor assembly 23 comprised of an aerodynamically faired hub 24 to which are mounted individual ones of a plurality of blades 25. The blades are spaced at equal intervals about a rotor axis 44 and are aerodynamically configured in the manner of a propeller blade. In turbine 10, there are three such blades in the rotor assembly. Each blade is bolted, as at 26, at its base or root end to a corresponding blade mount 27 defined by the rotor hub. The hub is carried on the projecting end of a rotor shaft 29 which extends into nacelle 12 where it is supported by front and rear roller bearings 30 and 31. respectively. The rotor shaft is connected to the input of a speed step-up gearbox 32 through a rubber coupling 33. The gearbox output shaft is coupled to the shaft of a main generator 34 via a secondary coupling 35 with which is associated a disc 36 of a hydraulic brake assembly having a caliper mechanism 37 mounted to the rear face of gearbox 32. A hydraulic pump 38 within the nacelle is connected to the caliper mechanism for operating the brake assembly as appropriate; in some turbines the brake calipers are spring loaded. A secondary generator 39 has its armature shaft coupled to the rear end of the armature shaft of the main generator by V-belts 40, the tension of which is adjusted by a tension adjustment mechanism 41.

The wind turbine 10 shown in the drawings and described thus far as an exemplary wind turbine is a Nordtank NTK 65/13 KW wind turbine. As manufactured in Denmark, according to what has come to be a relatively standard design, the turbine nacelle includes a 65 KW, three phase, 480 volt main generator 34 and a 13 KW, three phase, 480 volt secondary generator 39. As operated in the United States, such turbines usually include only the main generator, the secondary generator either being removed or disconnected from the main generator.

A wind direction sensor vane 43 is located above the exterior of nacelle 12 adjacent a rear portion of the nacelle. The vane is pivotally supported within the nacelle. If the vane, which responds to wind direction, is not aligned with axis 44 of rotation of rotor 23, the deviation of the sensor vane from axis 44 is sensed and a yaw drive control signal is generated. Within the nacelle, a yaw drive motor 45 (FIG. 2) is driven to produce rotation of a yaw drive shaft 46 (FIG. 4) which extends through nacelle foundation 20 to a lower end where the shaft carries a yaw pinion gear 47. The yaw pinion gear is engaged with an external main yaw gear 48 defined on that portion of bearing outer ring 14 which faces away from the yaw axis. Yaw drive shaft 46 is coupled to the yaw drive motor through a worm and a worm gear, not shown. The yaw drive motor operates in response to the control signal derived from the position of sensor vane 43 to drive the nacelle about the yaw axis so that the rotor axis points directly into the wind as it exists at that time. Because of the connection of the yaw drive shaft to the yaw drive motor through the worm and worm gear set, the yaw drive mechanism is not driveable in reverse. Thus, when the yaw drive motor is not operating, the cooperation of the yaw pinion with the yaw main gear is like that of a brake which holds the nacelle in its position about the yaw axis to which it was last driven by the yaw drive motor.

Even if rotor hub 24 is perfectly balanced and the set of blades 25 of the rotor assembly are statically balanced to within grams of each other before the blades are bolted to the rotor hub, the entire rotor assembly can still be out of balance by reason of the dynamic (rotating) center of mass of the rotor not being perfectly aligned with rotor axis 44. Such a condition can, and usually does exist because of blade-to-blade difference in the distribution of mass along the length of the several blades. Thus, as the rotor turns in use of turbine 10 at its characteristic speed of 0.781 Hertz, the imbalance of the rotor can apply cyclic loads to the nacelle. Those loads, when applied to the nacelle in horizontal directions, cause the nacelle to oscillate laterally about the yaw axis. Such loads and oscillations occur twice during each rotation of the rotor, first in one direction and then the other. Such oscillations, even if of low amplitude, are manifested as cyclic loads on the yaw drive mechanism, notably upon yaw shaft 46 and upon yaw pinion gear 47. Those loads, repeating at the rate of 47 cycles per minute, lead to failure of the yaw drive shaft or of the yaw pinion gear teeth, or both. When such failure occurs, the wind turbine becomes inoperative. In that event, it is necessary to shut down the turbine, as by operation of brake mechanism 36-38, and to repair the yaw drive mechanism by replacement of either or both of the yaw drive shaft and the yaw pinion gear; sometimes, the yaw main gear (i.e., the nacelle bearing assembly) must be replaced. Those are expensive and time consuming repairs. While the wind turbine is so shut down, it is not generating salable electrical power.

Therefore, to render the wind turbine reliable, and to prevent failure of the yaw drive system which begins to occur after 3800 to 4000 hours of service (about 8 to 12 months) it is desirable that the turbine rotor assembly 23 be balanced to cause its dynamic center of mass to lie on rotor axis 44. Because of the extremely slow rotational rate of a wind turbine rotor which may be almost but not perfectly balanced, the magnitude of the centrifugal force produced by rotor imbalance is low. These factors, in combination, previously made it impossible to balance wind turbine rotors in place using readily available equipment and widely accepted principles of vibration analysis and rotating mass balancing developed in the context of masses which rotate at much higher speeds than do wind turbine rotors.

Figure 3:
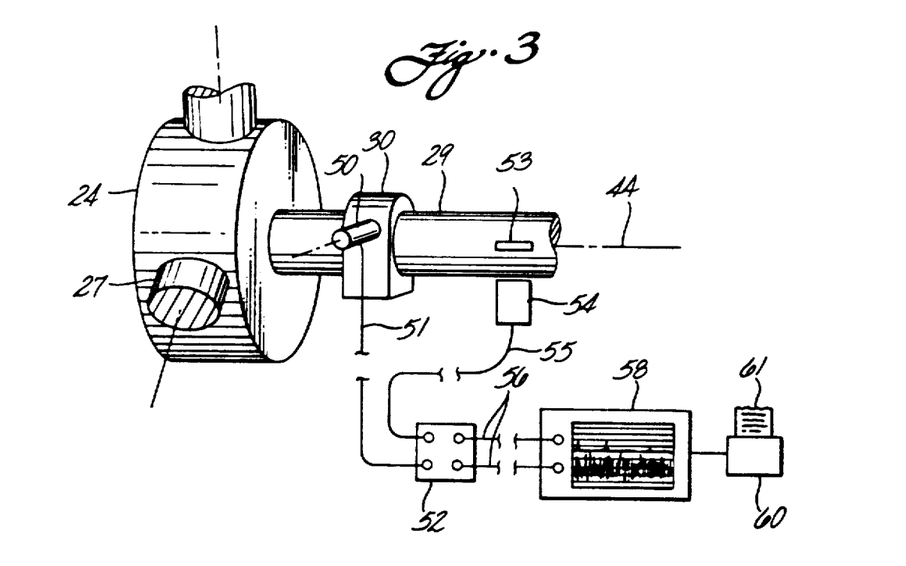
FIG. 3 is a semi-schematic illustration of the instrumentation used in the practice of this invention to balance the rotor of the turbine shown in FIG. 1.

Balancing of rotor assembly 23 is achieved simply, efficiently and reliably by the procedure described below, preferably using the equipment described below. A first step in the balancing process is to measure the value of a selected physical phenomenon attributable and to produced by imbalance of the rotor when the rotor is turning at its characteristic speed which, in this instance, is 0.781 Hz. The selected phenomenon preferably is acceleration. Measurement of acceleration experienced by the nacelle, as the unbalanced rotor turns, is measured by mounting a suitable accelerometer 50 to the side, not to the top, of front bearing 30 of rotor shaft 29.

It is important that accelerometer 50 be mounted on the side of the shaft bearing which is closest to the rotor assembly. It has long been accepted practice in the field of vibration analysis and rotor balancing to mount an imbalance sensing accelerometer or other suitable instrument transducer on the top of the bearing closest to the mass being balanced. In the context of low speed balancing situations, an extreme example of which is presented by turbine rotor 23, use of a sensor on the top of the bearing was found not to produce reliable or repeatable measurements of rotor imbalance. While the precise reasons for that circumstance are not fully known, it is believed that where the imbalance sensor is mounted on the top of the bearing, the bias of gravity on the slowly turning mass significantly masks the effects of rotor imbalance. Therefore, it has been found to be very important that the sensor used to measure the magnitude of rotor imbalance be mounted so that its sensitive axis is horizontal, namely, on a vertical side surface of the front bearing for rotor shaft 29. Such placement of the imbalance sensor enables the sensor to measure rotor imbalance along a line where the sensor is insensitive to the bias of gravity upon the rotating mass. The output signal from accelerometer 50 is applied via a signal cable 51 to one channel of a dual channel charge amplifier 52 located within nacelle 12 during the balancing procedure. The measurement obtained from the accelerometer is usefully indicative of the magnitude of rotor imbalance.

A reference signal for indicating the effective position of rotor imbalance is obtained by use of a shaft position sensor which includes a narrow, very high strength magnet 53 applied to rotor shaft 29 in alignment with rotor axis 44, preferably between bearings 30 and 31. A sensor coil assembly 54 is suitably mounted closely adjacent the position of the magnet on the shaft 29. Each time the magnet passes beneath its cooperating sensor, the sensor generates a spike signal which is applied via a signal cable 55 to the other channel of the dual channel charge amplifier. The position of the magnet on shaft 29 is arbitrary. Once the magnet has been positioned on the shaft, a notation is made about the location of the magnet relative to the rotor blades which are arbitrarily assigned numbers (1, 2 and 3) or given color codes (red, blue and yellow, for example) for purposes of reference and identification in the balancing process. The amplified rotor imbalance magnitude and shaft reference position signals are applied through conductors 56 to respective input terminals of a dual channel FFT (fast Fourier transform) signal analyzer 58. The preferably digital output of the analyzer is suitably applied to a printer 60 for recording on paper 61 the information displayed on the view screen of the analyzer. Such information display printouts are represented by the illustrations of FIGS. 6, 7, 8 and 9.

To obtain accurate measurements of rotor imbalance magnitude, it has been found not to be sufficient to rely upon the yaw drive mechanism of turbine 10 to hold nacelle 12 in place against rotation about yaw axis 13 while measurements of imbalance magnitude are made. Even with the placement of accelerometer 50 in a horizontal position on the side of front rotor bearing 30, reliable measurements of rotor imbalance could not be obtained while relying upon the yaw drive to hold the nacelle from rotating about the yaw axis; there is too much inherent play or backlash in the yaw drive mechanism. Therefore, to obtain accurate measurements of rotor imbalance magnitude via accelerometer 50, it is desireable to mechanically lock the nacelle to the tower as securely and as rigidly as possible against rotation about the yaw axis by a mechanism other than the yaw drive. Such a mechanism is the yaw lock assembly shown in FIGS. 4 and 5.

Figure 5:
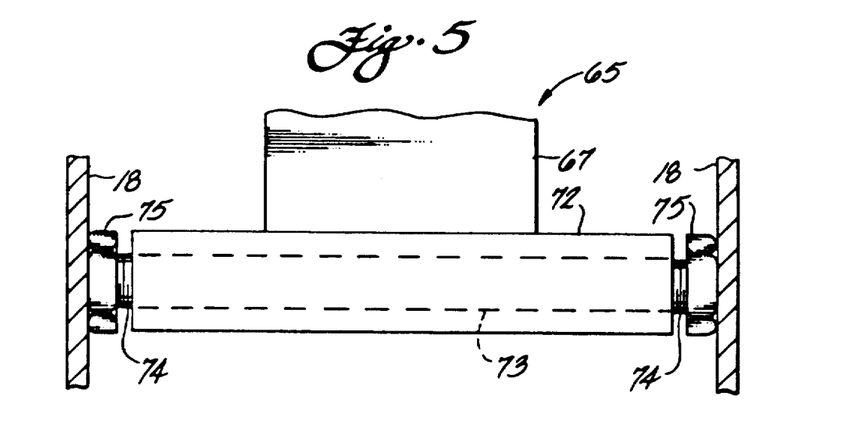
FIG. 5 is a fragmentary elevation view of the cooperation of the lower end of the yaw lock with the structure of the turbine tower.

The yaw lock assembly useful in turbine 10 is a substantially V-shaped rigid bracket 65 having a short leg 66 and a long leg 67 disposed at about a 45° angle to each other. The respective legs of the yaw lock bracket are preferably constructed of 2"×4"×¼" rectangular steel tube. The legs are connected together across their 4" dimensions. A gusset 68 is welded between the short and long legs of the bracket on each of the opposite sides of the bracket adjacent to the location where the bracket legs are connected to each other. Adjacent its end opposite from the long leg, a bolting plate 69 is welded to the 4" surface of the short leg which faces toward the long leg. The bolting plate extends from each of the opposite sides of the bracket short leg to define a pair of bolting lugs through each of which a bolting hole 70 is drilled. The spacing between the two bolting holes corresponds to the spacing between adjacent ones of bolts 21 which are provided to affix the outer ring of the nacelle bearing to the underside of the nacelle foundation.

An axially bored steel rod 72, preferably 1½ to 2 inches in diameter, is welded across the end of the long leg of the bracket at its end remote from the location at which the long and short legs of the bracket are connected. The opposite ends of the bore 73 of rod 72 are internally threaded to receive the shanks of respective ones of a pair of heavy duty ¾" diameter bolts 74 having heads 75. The length of bar 72 is selected so that when bolts 74 are screwed fully into the bar, with the heads of the bolts abutting the adjacent ends of the bar, the distance between the outwardly facing end surfaces of the bolt heads is less than the distance between opposing faces of an adjacent pair of gussets 18 carried by tower 11 at its upper end in association with bearing support plate 17.

To prepare turbine 10 for balancing, it is preferred that the nacelle be angularly positioned on the tower so that rotor axis 44 is perpendicular to the wind direction and the basic plane of the rotor blades is parallel to the wind direction. Such positioning of the nacelle on the tower enables the rotor to be driven by generator 34, operated as a motor, without appreciable aerodynamic effects being manifested on rotor blades 25 to mask the effects of rotor imbalance as detected by accelerometer 50. Accordingly, once the nacelle has been positioned with its axis perpendicular to the prevailing wind direction, an appropriate adjacent pair of bolts 21 are removed from their positions within the nacelle. The bolting plate carried by the short leg of the yaw lock is positioned over the exposed bolt holes and the bolts are then reinserted through the inner ring of the bearing assembly, the nacelle foundation and the yaw lock bolting plate 69 and secured in position That fixes the yaw lock relative to the nacelle. The lower end of the long leg of the yaw lock is positioned between an appropriate adjacent pair of gussets 18 and bolts 74 are then turned, in a direction to cause them to tend to unthread from bore 73, until bolt heads 75 securely wedge between the adjacent tower gussets. That fixes the yaw lock relative to the tower, and the nacelle is thereby rigidly, yet releasibly, secured in a fixed position on the tower.

Generator 34 is then operated as a motor to turn rotor 23 about its axis of rotation 44 at its service speed, i.e., 0.781 Hz. As the rotor is so driven, signals accurately indicative of the rotor imbalance magnitude and of the rotor shaft reference position are obtained from accelerometer 50 and shaft position sensor 54, respectively. Those signals, amplified by amplifier 52, are supplied through conductors 56, preferably unified in a cable, to signal analyzer 58 which preferably is housed in a service van 78 parked adjacent the base of tower 11. Cable 56 preferably is a 110 foot length of BNC cable which is run from the nacelle to the service van down the outside of tower 11. It has been found that if the cable from the charge amplifier in the nacelle to the signal analyzer in the service van is run down the inside of tower 11, the signals applied the analyzer are noisy. When the cable connecting the charge amplifier to the signal analyzer is run down the outside the tower, the signals applied to the signal analyzer are essentially free of extraneous noise.

Figure 6:
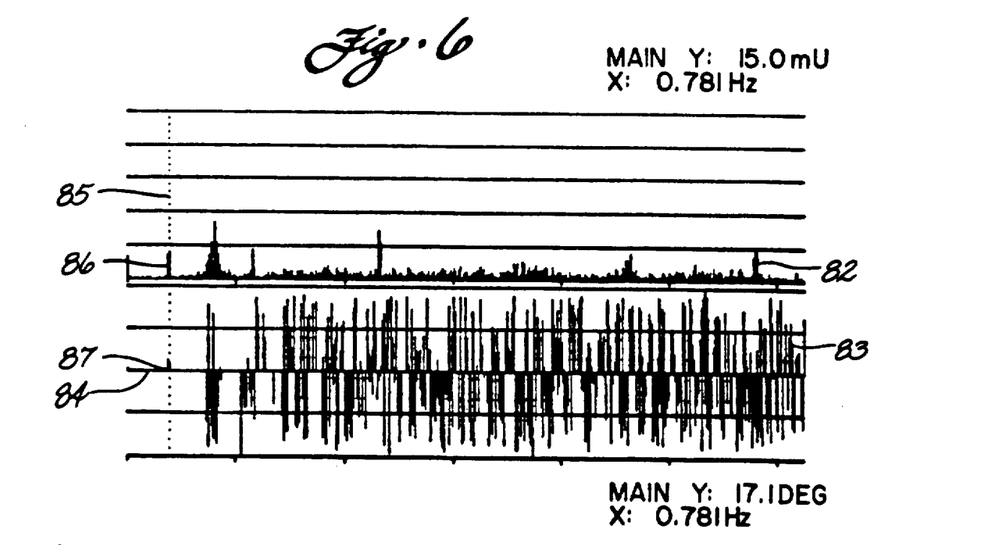
FIG. 6 is a representative printout, with reference to frequency, of the vibrations and vibration phase angles in a representative wind turbine of the kind shown in FIG. 1 before balancing.

FIG. 6 is a representation of the information presented on the display screen of the dual trace signal analyzer when the rotor is run in its "as is" unbalanced condition in the manner set forth above, which information is also obtained as a printout 61 from printer 60. In FIG. 6, trace 82 presents information about the amplitude of vibration sensed over a range of frequencies, while trace 83 contains information about the phase angles of those vibrations over the same frequency range. Phase angle information is presented as a ± excursion from a zero angle reference line 84. The dotted vertical reference line 85 at the left end of FIG. 6 denotes the service turns rate of the rotor, namely, 0.781 Hertz. The spike 86 at the left end of trace 82 along reference line 85 is a representation of the magnitude of the fundamental vibration experienced by the nacelle due to imbalance of rotor 23; the corresponding spike 87 in trace 83 is a representation of the phase angle of the effective location of rotor imbalance relative to the arbitrarily selected zero angle reference point defined by magnet 53 on shaft 29. The data in FIG. 6 show that the magnitude of rotor imbalance is 15.0 milliunits (15.0 mU) at a frequency of 0.781 Hertz, which is the motored-up turns rate of the rotor. Also, the data in FIG. 6 show that the location of the effective position of rotor imbalance is 17.1° positive from the position of magnet 53. Thus, FIG. 6 presents information descriptive of the "as is" unbalanced condition of rotor 23.

Before the rotor is initially powered-up for development of the data shown in FIG. 6, a mounting arm 90 for curative weights is mounted to the rotor in association with each rotor blade, as shown in FIG. 2. Each weight support arm is identical in configuration, dimension and weight to each other arm mounted to the rotor. Each arm 90 is mounted to the rotor by temporarily removing one or two of bolts 26 which secure each blade 25 to its support 27, and then reinstalling the bolt through a suitable hole formed in a base flange of the arm. The three weight support arms 90 become permanent components of the rotor.

Figure 7:
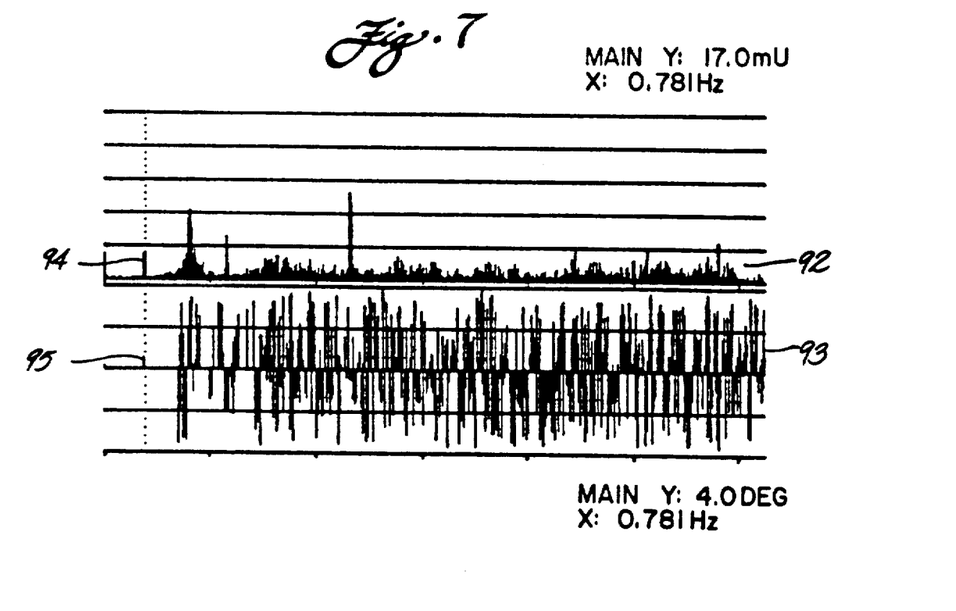

FIG. 7 presents data similar to that shown in FIG. but for a different balance condition of the rotor. Traces 92 and 93 of FIG. 7 present information which is of the same kind as the information presented in traces 82 and 83, respectively, of FIG. 6. In this instance, however, they describe the condition of unbalance of the rotor after a ten pound trial weight has been applied to the weight support arm associated with the "1" or "red" blade of the rotor. The information in FIG. 7 shows that the rotor unbalance now has a magnitude of 17.0 milliunits as represented by spike 94 in trace 92, and a phase angle of +4.0° as represented by a spike 95 of trace 93. This imbalance condition is not sufficiently different from the imbalance condition shown in FIG. 6 to enable an accurate determination of the amount and location of curative weights to be applied to the rotor. In order that the information developed from the application of trial balance weights to the rotor can provide an accurate determination of the amount and distribution of curative weights sufficient to balance the rotor within acceptable limits, the criteria for change from the "as is" unbalanced condition are that the change in phase angle should be greater then 25°. The change in location of the effective unbalance from FIG. 6 to FIG. 7 is less than 25°. Therefore, it is appropriate to increase the test weight applied to the weight support arm associated with the "1" or "red" blade of the rotor.

Figure 8:
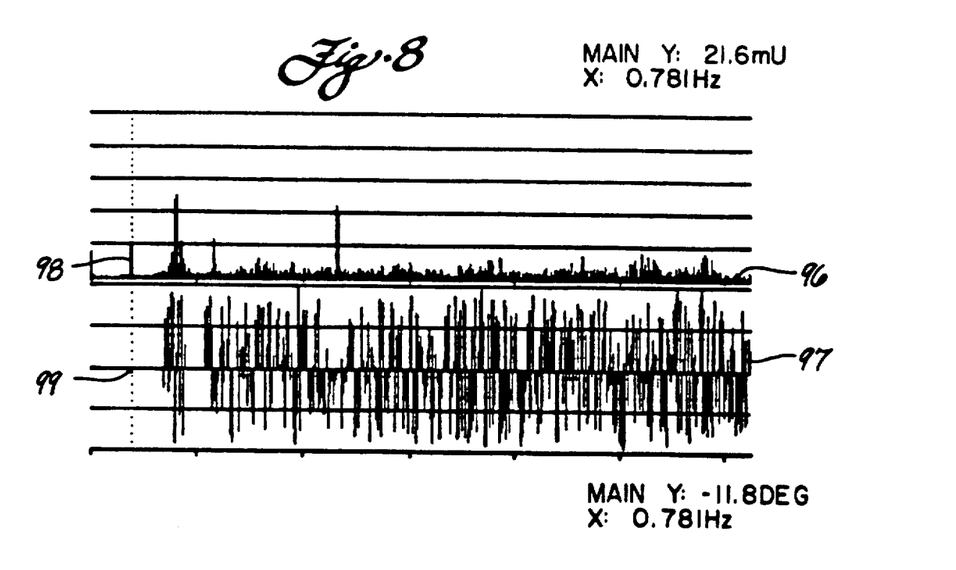
FIG. 8 is a depiction, similar to those of FIGS. 6 and 7, showing the unbalance magnitude and phase angle when a second greater diagnostic weight is applied to the rotor.

FIG. 8 presents traces 96 and 97 which contain information similar to that contained in traces 92 and 93 of FIG. 7 when a 20 pound test weight is applied to the "1" or "red" weight support arm. In this instance, the magnitude of rotor imbalance, as indicated by spike 98 of trace 96, is 21.6 milliunits and the phase angle of that imbalance is now −11.8° as indicated by spike 99 at the left end of trace 97. Because the imbalance phase angle has now changed from the "as is" imbalance condition by more than 25°, FIG. 8 contains information which enables the amount and distribution of curative weights to be determined. The solution to that problem is that 5 pounds of curative weight are to be applied to the "1" or "red" weight support arm, 29 pounds of curative weight are to be applied to the "2" or "blue" weight support arm, and no weights are to be applied to the "3" or "yellow" weight support arm. The curative weights are applied at a known distance from the rotor axis; in the example to which FIGS. 6 through 9 are pertinent, that distance is 4 feet.

Figure 9:
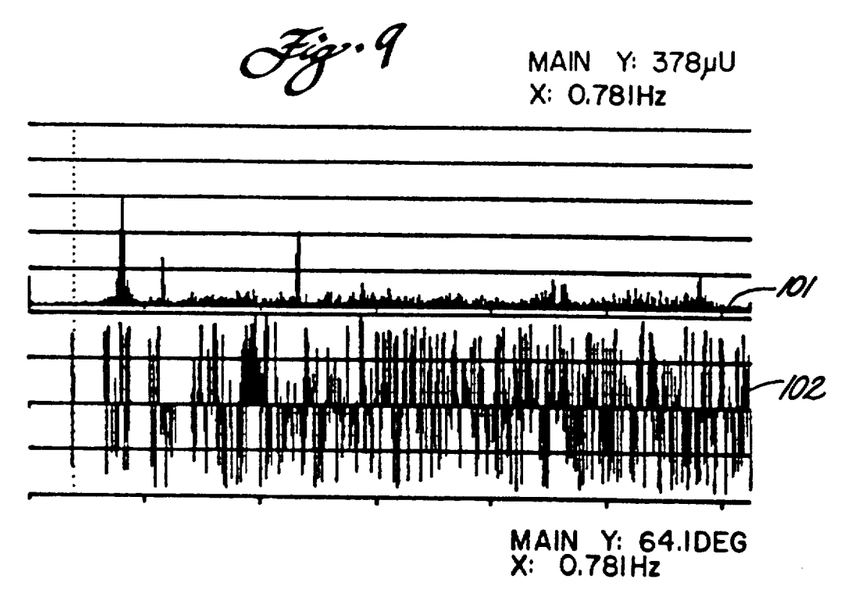
FIG. 9 is a depiction, similar to those of FIGS. 6, 7 and 8, showing the residual unbalance amount and phase angle of the same,,turbine after curative weights have been applied to the rotor to balance the rotor.

FIG. 9 presents information which confirms the effectiveness of the balance of rotor 23 by the application of 5 and 29 pounds of curative balancing weights to the "1" and "2" weight support arms. Thus, in FIG. 9, traces 101 and 102 present information of the same kind as found in traces 82, 92 and 96, and in traces 83, 93 and 97, respectively. The residual imbalance in the rotor is now 378 microunits, i.e., 0.378 milliunits, and the phase angle of that residual imbalance is 64.1°. The residual imbalance of 0.378 milliunits is negligible. The residual imbalance in the rotor is 2.5% of the original imbalance. In other words, 97.5% of the unbalance in the rotor has been eliminated. If the residual imbalance in the rotor after balancing is 0.750 milliunits (750 microunits) or less, the rotor is considered to be satisfactorily balanced.

Curative weights are provided in sizes of 10, 5, 1, ½ and 1/10 pounds. Curative weights and their fasteners are weighed to an accuracy within 1/10 pound before they are mounted to the weight support arms. In applying curative weights to the weight support arms, the total weight applied to each arm should be distributed as evenly as possible on the opposite sides of the arm.

Weight support arms 90 are mounted to the respective blades to the rear of the blade roots so that any curative weight applied to an arm lies as close as possible to the axis of the blades. As shown in FIG. 1, the blades are raked approximately 5° rearwardly from their roots toward their tips. Such blade rake is provided in combination with a preferred positive elevation of the rotor axis by an angle of 5° from a horizontal reference line.

The "units" referred to in the preceding description are the units which are used in vibration and balancing equipment manufactured by Bruel & Kjaer (B&K) Instruments. Bruel & Kjaer, headquartered in Denmark, is a major worldwide manufacturer of instruments for analysis of vibrations and other physical phenomena. Its principle United States office is located in Massachusetts with other offices throughout the United States, including in Orange, California.

Figure 10:
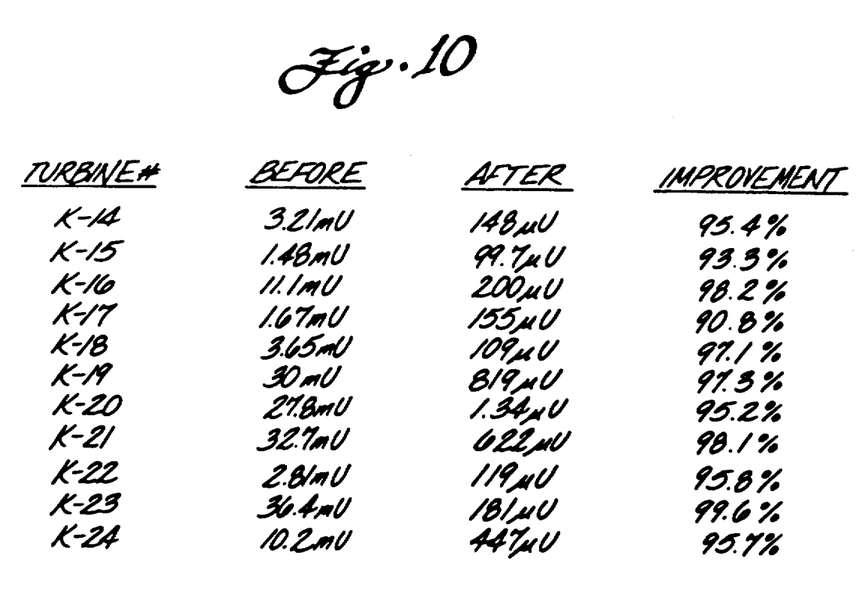
FIG. 10 is a table showing the pre-balancing and post-balancing unbalance conditions in a series of wind turbines balanced through the use of the present invention, together with evaluations of the percentage improvement in rotor balance in each instance.

FIG. 10 is a table which sets forth before and after imbalance values and improvement percentage values for 11 Nordtank NTK 65/13 KW wind turbines, located in the North Palm Springs area, which have been very effectively balanced by the procedures and apparatus described above.

In the presently preferred practice of this invention, the preferred acceleration sensing accelerometer is a B&K 4370X high sensitivity, delta shear piezoelectric accelerometer which is used with a B&K UA0462 magnetic mount. A B&K AO-0038/S accelerometer cable, 8 feet in length, is used to couple the accelerometer to a B&K 2635 charge amplifier. The magnet used to establish the shaft reference position pulse is a 1"×¼"×¼" neodymium-iron-boron permanent magnet, 27 million gauss oersteds, part No. F37108 in the 1990 Catalog 10N7 of Edmund Scientific Company. The presently preferred signal analyzer is a B&K 2034 dual channel FFT signal analyzer, to the A channel of which the acceleration signal is applied and to the B channel of which the shaft position signal is applied. The presently preferred printer used is a Hewlett Packard 2225A jet printer. The program used to obtain a balancing solution from the information provided from the "as is" unbalance condition data and the appropriate trial weight unbalanced condition data (namely, FIGS. 6 and 8) is a B&K WW9021 Balancing Calculation Program run on a Hewlett Packard 416U programmable handheld calculator. As noted above, in running that calculation program, the radius at which curative weights are applied to the rotor to achieve balancing of the rotor is established at 4 feet.

An unexpected benefit of accurate balancing of wind turbine rotors has been discovered. Before being balanced, some of the turbines referred to in the table of FIG. 10 would not begin to operate until wind speeds reached about 18 miles per hour. It has been found that after being balanced, those turbines now begin to operate, in gentle breezes.

If, as is possible, the nacelle bearing assembly is configured to have its inner annular member affixed to the tower, the main gear of the yaw drive mechanism could be defined as an internal gear on the inner surface of that ring. In that event, the yaw lock 65, described above, would require redesign to cooperate in the desired manner between the tower and the nacelle in parallel with the yaw drive mechanism. The yaw lock could cooperate between the nacelle and bearing support plate gussets located at intervals around the upper exterior surface of the tower.

Persons skilled in the art to which this invention pertains will readily recognize that the yaw lock structure illustrated in FIGS. 4 and 5 is configured with specific reference to the particular design of turbine with which it is used. In the balancing of turbines of different design, a yaw lock of different design, well within the talents of a skilled mechanical engineer, may be required.

In addition to the use of this invention for in situ balancing wind turbines which have rotors which rotate about horizontal axes and which are supported by nacelle assemblies rotatably mounted atop supporting towers, the teachings and principles of this invention can also be used to balance in situ the rotating blade assemblies of Darius wind turbines. A Darius turbine has a blade assembly which rotates about a vertical axis defined by bearing assemblies located at the top and near the bottom of a supporting pylon about which the blade assembly rotates.

In broad terms, the balancing procedures described above are dynamic in nature in that they pertain to the balancing of a rotatable mass as it turns in place in its intended environment at its intended service or design speed. In the parlance of the field of vibration analysis and rotor balancing as applied to things which rotate at rates much higher than the rates at which wind turbines rotors turn, the balancing of rotor 23 of turbine 10 would be described as static balancing, i.e., the balancing at service turns rate of rotating things which have a diameter greater than about seven times their axial extent. In that same field, the term "dynamic balancing" pertains to the balancing at service turns rate of a mass having a diameter less than about seven times its axial extent. Regardless of the terminology used to describe it, it is apparent that this invention significantly lowers the lower limit or threshold, in terms of turns rate, of the range of rotating thighs which can usefully be analyzed for imbalance and vibration under operating conditions and which can successfully and reliably be treated to materially reduce such imbalance and such vibration.

In the context of in situ balancing of wind turbines, the practice of this invention has benefits beyond that of the virtual elimination of yaw drive failure. Turbine rotor imbalance also adversely affects the life and performance of other components of a turbine, such as rotor shaft bearings, generator drive train couplings and gearboxes, and any other turbine component, including the rotor support tower itself, which is susceptible to failure or life reduction, such as by metal fatigue, when subjected to cyclic variations in applied loads. The harmonics of the fundamental vibrations produced by rotor imbalance have effects throughout the entire structure of the turbine as shown by the vibration frequency spectra presented in FIGS. 6–9, particularly where a harmonic frequency corresponds to the resonant frequency of a turbine component.

The preceding description of the procedural and structural aspects of this invention have been set forth in the context of the presently preferred methodology and hardware for practicing the invention. Therefore, the preceding description is not intended to be, nor should it be read as, an exhaustive catalog of all of the procedural and structural arrangements which may be found useful to practice and to implement the advance which this invention provides over the art theretofore existing.

What is claimed:

1. A process for in situ balancing of a wind turbine rotor as a component of a wind-powered generator in which the rotor is carried on a substantially horizontal shaft in a generator nacelle which is rotatable about a substantially vertical yaw axis atop a supporting tower, the process including the steps of locking the nacelle to the tower independently of the presence of any mechanism for driving the nacelle about the yaw axis relative to the tower, and, while the nacelle is locked to the tower, measuring the value of a phenomenon the magnitude of which is indicative of unbalance of the rotor.

2. A process according to claim 1 in which the locking step includes releasably yet securely connecting between the nacelle and the tower an essentially rigid member.

3. A process according to claim 2 wherein the connection of the nacelle to the tower includes a yaw drive mechanism, and including connecting the rigid member between the tower and the nacelle so as to cooperate in parallel with the yaw drive mechanism.

4. A process according to claim 1 wherein the rotor shaft is supported in bearings in the nacelle along the length of shaft, including measuring the value of the phenomenon at the side of the shaft bearing most proximate the rotor along a substantially horizontal line disposed substantially normal to the shaft axis.

5. A process according to claim 4 wherein the phenomenon is acceleration.

6. A process according to claim 5 including generating at the nacelle signals indicative of acceleration and of rotor shaft position and conducting those signals from the nacelle to a signal processor via conductors disposed outside the tower.

7. A process according to claim 1 wherein the rotor includes a plurality of blades carried on a rotor hub, and including mounting to the hub in association with each blade a holder for rotor balancing curative weights, and mounting to a selected one or to a selected adjacent pair of the holders curative weight adequate in amount and distribution to essentially balance the rotor.

8. A process according to claim 1 including locking the nacelle to the tower in such relation of the nacelle to the tower that the rotor shaft is substantially normal to the then-prevailing wind direction, if any, and operating the generator as a motor to rotate the rotor at a selected speed while measuring the value of the phenomenon.

9. A process according to claim 8 wherein the selected sped is essentially equal to a service speed of the rotor when turning in response to wind to drive the generator and is less than one revolution per second.

* * * * *